Dec. 22, 1936. G. G. OMERLY, JR 2,065,242

WINDSHIELD PROTECTOR

Filed Aug. 29, 1936

Inventor:

George G. Omerly, Jr.,

By Parker Cook.

Attorney.

Patented Dec. 22, 1936

2,065,242

UNITED STATES PATENT OFFICE 2,065,242

WINDSHIELD PROTECTOR

George G. Omerly, Jr., Wyncote, Pa.

Application August 29, 1936, Serial No. 98,568

2 Claims. (Cl. 296—84)

My invention relates to new and useful improvements in windshield protectors and has for an object to provide a protector that may be quickly and easily secured over the windshield of a car if the car is to be left in an unprotected place during inclement weather.

All automobiles of the present day are streamlined, the windshields sloping rearwardly, there being no provision made for keeping the snow or sleet off the said windshield.

During the winters, therefore, in climates where there is snow and ice, if the automobile is left in a parking lot during the day or night, or is left in a yard or on the street, a snowstorm will completely cover the glass windshield and, as some of the snow melts from the heat of the car, it will eventually turn into ice; so that, before the driver can again use the car, it is often necessary to chip and scrape the ice and snow from the windshield.

The windshield wiper is often frozen tightly to the glass after long parking and even though a defroster is used, the ice and snow will be so thick upon the windshield that it will take a relatively long time for the defroster to so soften the snow or ice that it may be scraped from the windshield.

Another object of my invention, therefore, is to provide a protector that may be quickly fitted over the windshield when a car is to be parked in an unprotected place, which will prevent the snow and ice from freezing on the glass, and will also prevent the windshield wiper from being frozen. However, when the car is to be used, it is only the matter of a moment to open first one door and then the other, so that the two upper straps that hold the protector in place may be dislodged and then the two other loops unhooked, so that the protector may be removed, at the same time removing all the snow and ice that has collected thereon, after which the cover may then be folded or rolled and placed in the map pocket in the door.

Still another object of the invention is to provide a windshield protector that may be readily attached in place, that is, over the windshield, and may be just as readily detached.

Still another object of the invention is to provide a windshield protector wherein there is no necessity of providing special fixtures, such as screws or bolts or eyelets or hooks to hold the protector in place. Simply, certain elastic straps and loops are so arranged that they may be fastened between the door and the car body and over the respective hinges or handles of the doors to hold the protector tightly stretched over the windshield.

Still another object of the invention is to provide a windshield protector that is exceedingly simple to manufacture so that the same may be sold at a relatively low cost.

Still another object of the invention is to provide a windshield protector that when not in use may be folded or rolled into a small compact package and easily stowed in the pocket of the door of the car.

With these and other objects in view, the invention consists in certain new and novel arrangements and combination of parts as will be hereinafter more fully explained and pointed out in the claims.

Referring now to the drawing showing a preferred embodiment,

Figure 1:
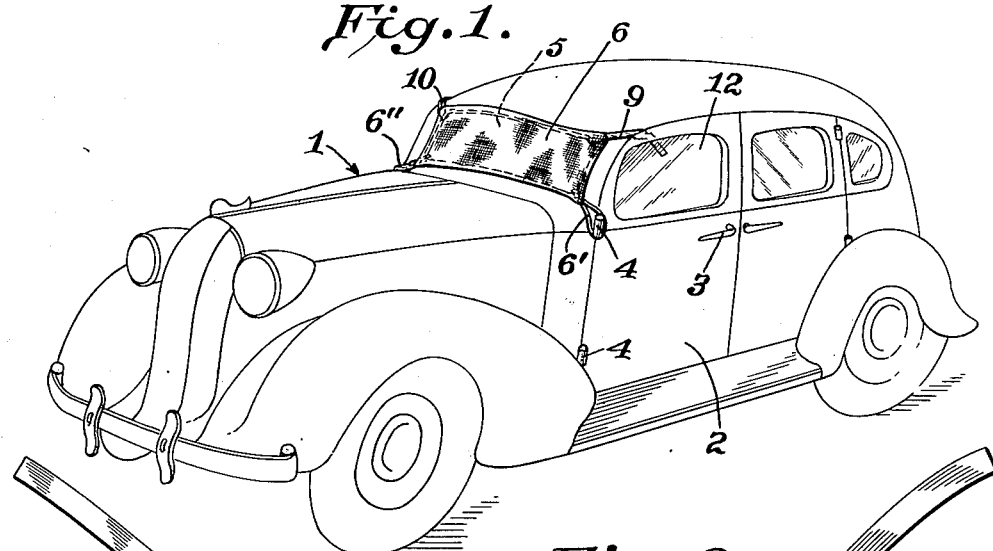
Fig. 1 is a perspective of a streamlined automobile with my invention shown in its attached position.
Figure 2:
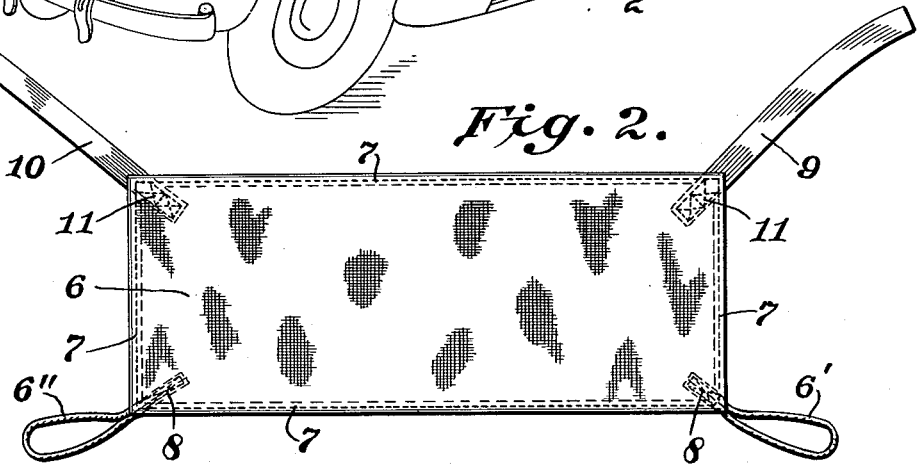
Fig. 2 is a plan view of my new and improved windshield protector.
Figure 3:
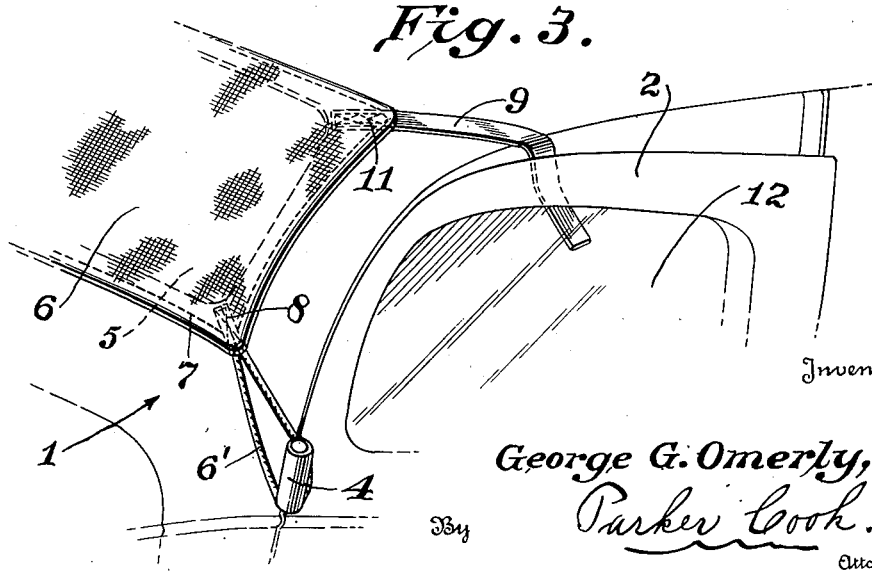
Fig. 3 is a fragmentary detail showing a door in a partly opened position preparatory to clamping one of the elastic straps in position.

Referring now more specifically to the several views, there is shown a streamlined automobile 1 having the door 2 with its handle 3 and its hinges 4, this structure, of course, being the same on the opposite side of the car.

The glass windshield 5, it will be noticed, slopes sharply from the front towards the rear, and as the cars are built today without visors or other protections for the windshield, the snow and ice will quickly collect unless the windshield is in some way protected.

Thus, to prevent the snow and ice from accumulating on the car when left in an uncovered condition in a snowstorm or sleet, during freezing weather, I have provided a windshield protector which is preferably a rectangular piece of fabric 6, sufficient in length and width to completely cover the windshield 5.

This fabric may be oilcloth, rubber or a rubberized fabric or any other desirable material that is impervious to water.

It does not necessarily have to be relatively thick, but should be made out of cloth or material that can be easily folded or rolled and placed in the car when not in use.

The material may be hemmed as at 7 about its marginal edges so that the same will not tear or fray from constant use.

In an article of this kind, it is also extremely desirable that a simple and convenient means be provided for holding the device in place, as, if special brackets or hooks or eyes have to be placed on the body of the car, it will interfere with its sale and use.

The present windshield protector, therefore, is constructed in a novel manner with means that will tightly stretch the protector in position and make it possible to attach the same in less than a minute. Likewise, it may be as quickly detached and stored in the car when the car is in use or when the weather is such that it is unnecessary any longer to use the protector.

This attaching means is accomplished by providing a loop 6' at one lower corner of the shield, and a similar loop 6'' at the opposite lower corner, which loops fit over the hinges 4.

These loops are preferably formed of narrow elastic strips and are stitched at their free ends as at 8 to the body of the protector. The length of these loops is such that when the protector is in position the loops will be in a tightly stretched condition.

To each upper corner of the protector is stitched the respective relatively wide elastic strips 9 and 10, the inner ends of the same extending far enough inwardly from the corners that the stitching 11 may securely hold these strips to the body of the protector.

These strips 9 and 10 are also of such length that they can be held in a stretched condition and placed between the roof of the car (door frame) and the upper edge of the door, so that when the door is closed the strips will be in a stretched condition, in a manner similar to the loops.

Before explaining the most convenient way of attaching this windshield protector, it might be mentioned that in some makes of cars the upper hinge 4 is positioned about where the handle 3 now appears, and the hinges are on the opposite edge of the door. When a shield is attached to a car having doors of this type, the loop 6' would be over a handle, rather than a hinge.

The shield is easily attached as follows:

The shield will be unrolled and the loop 6' placed over the hinge 4. The window 12, as well as the door, may be opened and the end of the strap 9 grasped and pulled rearwardly the proper distance, and then the door swung shut to clamp the stretched strip 9. This strip, being relatively wide, will not slip after once being clamped between the door and frame.

After this end of the shield is attached, the operator will walk to the other side of the car and adjust the loop 6'' over the hinge on that side of the car, then open the door corresponding to 2 and grasping the strip 10 in the one hand, will stretch it tightly to a desired position, then place the strap between the door and door frame and, while the strap is held in the stretched position, shut the door.

The windshield protector is now held in a tightly stretched position from the four corners over the windshield, and over the windshield wiper, if there is one.

The car now may be left in an uncovered position in any sort of weather, as any snow and ice will collect on the protector, rather than on the windshield.

When it is again desired to use the car, the loops may be removed from the hinges 4 and each door opened to respectively release the straps 9 and 10.

The windshield will be in a clear condition and if it is snowing, the windshield wiper may be quickly started, as well as a defroster, to prevent any ice from accumulating on the windshield.

The snow and ice can be easily removed from the windshield protector, which may now be rolled and placed within the car, ready again for instant use.

From the foregoing it will be seen that I have provided a windshield protector that is highly efficient, relatively cheap to manufacture, easily attached and just as easily detached and stored.

Finally, no extra attaching means have to be placed on the car to hold the windshield protector in position.

Having thus described my invention, what I claim as new and desire to secure by Letters Patent is:

1. A windshield protector including a rectangular fabric body portion of a size coextensive with the windshield of an automobile, depending elastic loops secured to the lower respective corners of said body portion and adapted to be hooked over the upper hinges of the door of said automobile, upwardly extending elastic strips secured to the respective upper corners of the body portion of the protector, said strips adapted to be held between the upper edge of the door and the door frame and the said loops and the said strips thereby tightly holding the protector over the said windshield.

2. A windshield protector including a body portion formed of material impervious to water, rectangular in shape, and of such height and width as to completely cover the windshield of an automobile when in position, elastic loops secured to the lower respective corners of said body portion of the protector and adapted to be secured to projections from the automobile beneath the windshield, elastic strips stitched to the upper respective corners of the body portion of the protector, said strips adapted to be held between the respective doors and door frames of the automobile, the elastic loops and strips thereby tightly stretching the windshield protector in position.

GEORGE G. OMERLY, Jr.